(12) United States Patent
Huang

(10) Patent No.: US 7,874,044 B1
(45) Date of Patent: Jan. 25, 2011

(54) LEVERAGE-TYPE HINGE AND PORTABLE ELECTRONIC DEVICE

(75) Inventor: Chieh Huang, Shulin (TW)

(73) Assignee: Shin Zu Shing, Ltd., Shulin, Taipei Hsien (TW)

( * ) Notice: Subject to any disclaimer, the term of this patent is extended or adjusted under 35 U.S.C. 154(b) by 0 days.

(21) Appl. No.: 12/509,524

(22) Filed: Jul. 27, 2009

(51) Int. Cl.
*E05F 1/08* (2006.01)
(52) U.S. Cl. .................................................... 16/286
(58) Field of Classification Search ............ 361/679.27, 361/679.58, 679.12; 455/90.3; 49/96, 101, 49/108, 122, 242, 256, 328, 329, 496.1
See application file for complete search history.

(56) References Cited

U.S. PATENT DOCUMENTS

| | | | | | |
|---|---|---|---|---|---|
| 2,298,767 | A | * | 10/1942 | Johnson | 112/258 |
| 5,077,551 | A | * | 12/1991 | Saitou | 345/207 |
| 5,764,474 | A | * | 6/1998 | Youens | 361/679.12 |
| 6,008,986 | A | * | 12/1999 | Mok | 361/679.12 |
| 6,437,978 | B1 | * | 8/2002 | Ozaki et al. | 361/679.46 |
| 7,338,019 | B2 | * | 3/2008 | Liu et al. | 248/123.11 |
| 7,375,295 | B2 | * | 5/2008 | Hsu | 200/5 A |
| 7,562,416 | B2 | * | 7/2009 | Lautenschlager et al. | 16/286 |
| 2004/0203526 | A1 | * | 10/2004 | Romeu et al. | 455/90.3 |
| 2007/0028419 | A1 | * | 2/2007 | Lu et al. | 16/366 |
| 2008/0034540 | A1 | * | 2/2008 | Avery et al. | 16/286 |

* cited by examiner

*Primary Examiner*—Victor Batson
*Assistant Examiner*—Matthew Sullivan
(74) *Attorney, Agent, or Firm*—The Weintraub Group, P.L.C.

(57) ABSTRACT

A leverage-type hinge is mounted in a portable electronic device with a base, a cover and a driven panel. The cover and the driven panel are connected pivotally to the base. The leverage-type hinge has an actuating sleeve and a leverage bracket. The actuating sleeve is rotated with the cover and has an actuating protrusion. The leverage bracket is mounted pivotally on the base and has a free end abutting the driven panel. When the cover is opened relative to the base, the actuating protrusion presses a receiving end of the leverage bracket to pivot the leverage bracket. Then the free end of the leverage bracket pushes the driven panel to tilt. Therefore, the driven panel is tilted while the cover is opened to facilitate utilization of elements on the driven panel.

15 Claims, 10 Drawing Sheets

LEVERAGE-TYPE HINGE AND PORTABLE ELECTRONIC DEVICE

BACKGROUND OF THE INVENTION

1. Field of the Invention

The present invention relates to a leverage-type hinge, especially to a leverage-type hinge that is mounted between a cover and a base of a portable electronic device to allow the cover and an additional unit to pivot relative to the base.

2. Description of the Prior Arts

A conventional portable electronic device has a base and a cover. A conventional hinge is mounted between the base and the cover to allow the cover to pivot relative to the base. With changing lifestyles, portable electronic devices such as notebook and notebook computers, PDAs, smart phones and cell phones are widely used. Portable electronic device markets are highly competitive and functions of the portable electronic devices are mature and well developed. Therefore, except for developing new functions and adding extras, improving other parts of the portable electronic devices such as appearance and convenience is more and more important for the manufacturer to enhance uniqueness and to attract buyers.

SUMMARY OF THE INVENTION

The main objective of the present invention is to provide a leverage-type hinge for a portable electronic device. The leverage-type hinge is mounted in the portable electronic device with a base, a cover and a driven panel. The cover and the driven panel are connected pivotally to the base. The leverage-type hinge has an actuating sleeve and a leverage bracket. The actuating sleeve is rotated with the cover and has an actuating protrusion. The leverage bracket is mounted pivotally on the base and has a free end abutting the driven panel. When the cover is opened relative to the base, the actuating protrusion presses a receiving end of the leverage bracket to pivot the leverage bracket. Then the free end of the leverage bracket pushes the driven panel to tilt. Therefore, the driven panel is tilted while the cover is opened to facilitate utilization of elements on the driven panel.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
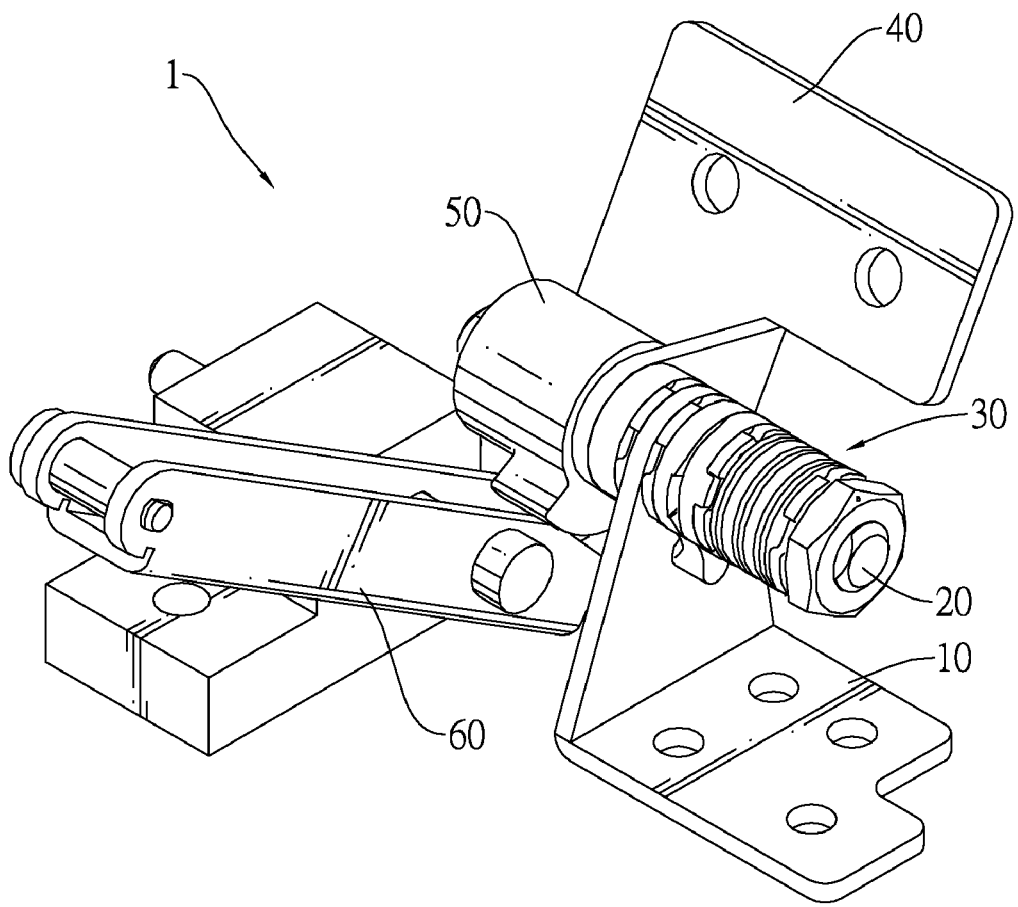
FIG. 1 is a perspective view of a leverage-type hinge in accordance with the present invention.
Figure 2:
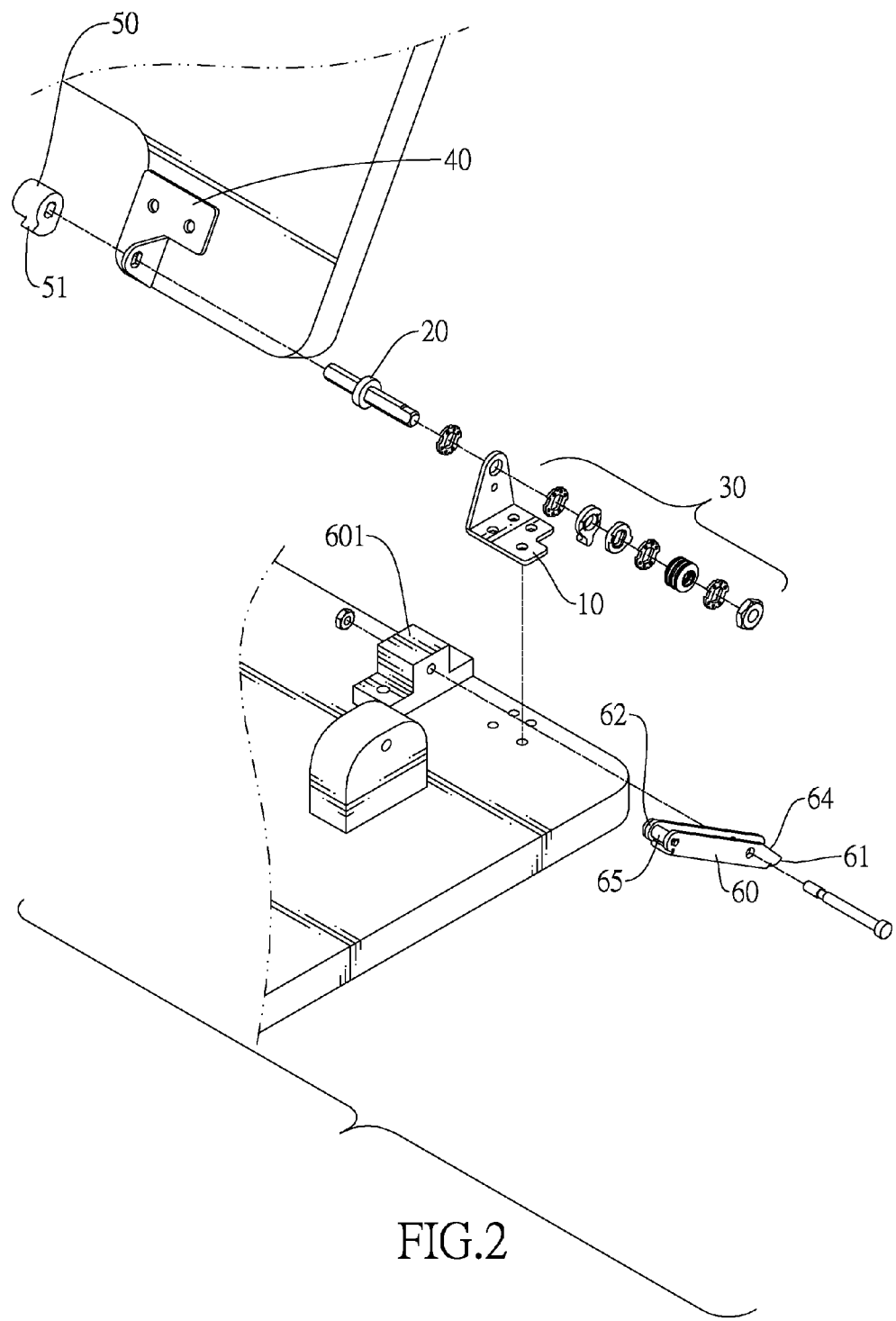
FIG. 2 is a partially exploded perspective view of a portable electronic device in accordance with the present invention with a leverage-type hinge in FIG. 1.

With reference to FIGS. 1 and 2, a leverage-type hinge (1) in accordance with the present invention comprises a stationary bracket (10), a pintle (20), a washer assembly (30), a rotating bracket (40), an actuating sleeve (50) and a leverage bracket (60).

The pintle (20) is mounted through the stationary bracket (10). The washer assembly (30) is mounted around the pintle (20) to provide friction, positioning and limiting functions. Detailed structures and alteration are well known in the art and are not discussed here.

The rotating bracket (40) is mounted securely around and is rotated simultaneously with the pintle (20).

The actuating sleeve (50) is mounted securely around and is rotated simultaneously with the pintle (20) and has an actuating protrusion (51). The actuating protrusion (51) is formed on and protrudes transversely out from an outside wall of the actuating sleeve (50).

Figure 3:
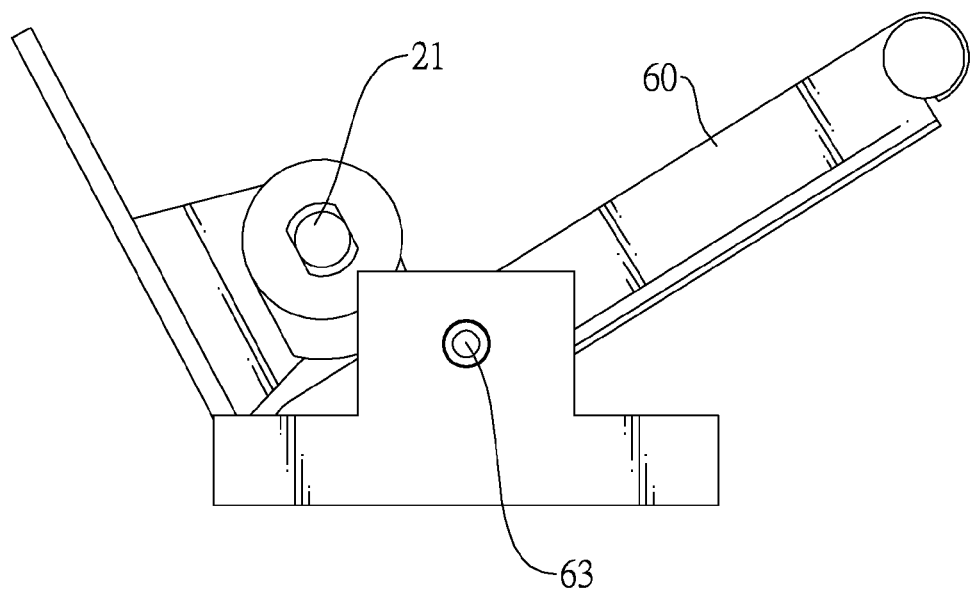
FIG. 3 is a side view of the leverage-type hinge in FIG. 1.

With reference to FIGS. 1 to 3, the leverage bracket (60) is adjacent to the actuating sleeve (50), is connected pivotally to a seat (601) and has a receiving end (61), a free end (62) and a sliding pin (65). A pivoting shaft (63) protrudes transversely through the leverage bracket (60) and is mounted rotatably in the seat (601) to connect the leverage bracket (60) pivotally to the seat (601). The pivoting shaft (63) is eccentrically mounted relative to a pivot center (21) of the pintle (20). The receiving end (61) selectively abuts the actuating protrusion (51) of the actuating sleeve (50) and may have an inclined surface (64). The sliding pin (65) is mounted across the free end (62).

When the actuating sleeve (50) is rotated with the pintle (20), the actuating protrusion (51) selectively abuts the inclined surface (64) of the receiving end (61). When the actuating protrusion (51) does not abut the inclined surface (64), the leverage bracket (60) maintains an initial position. When the actuating protrusion (51) abuts the inclined surface (64), the receiving end (61) is pushed to move downward. Then the leverage bracket (60) is pivoted and the free end (62) is moved upward.

Figure 4:
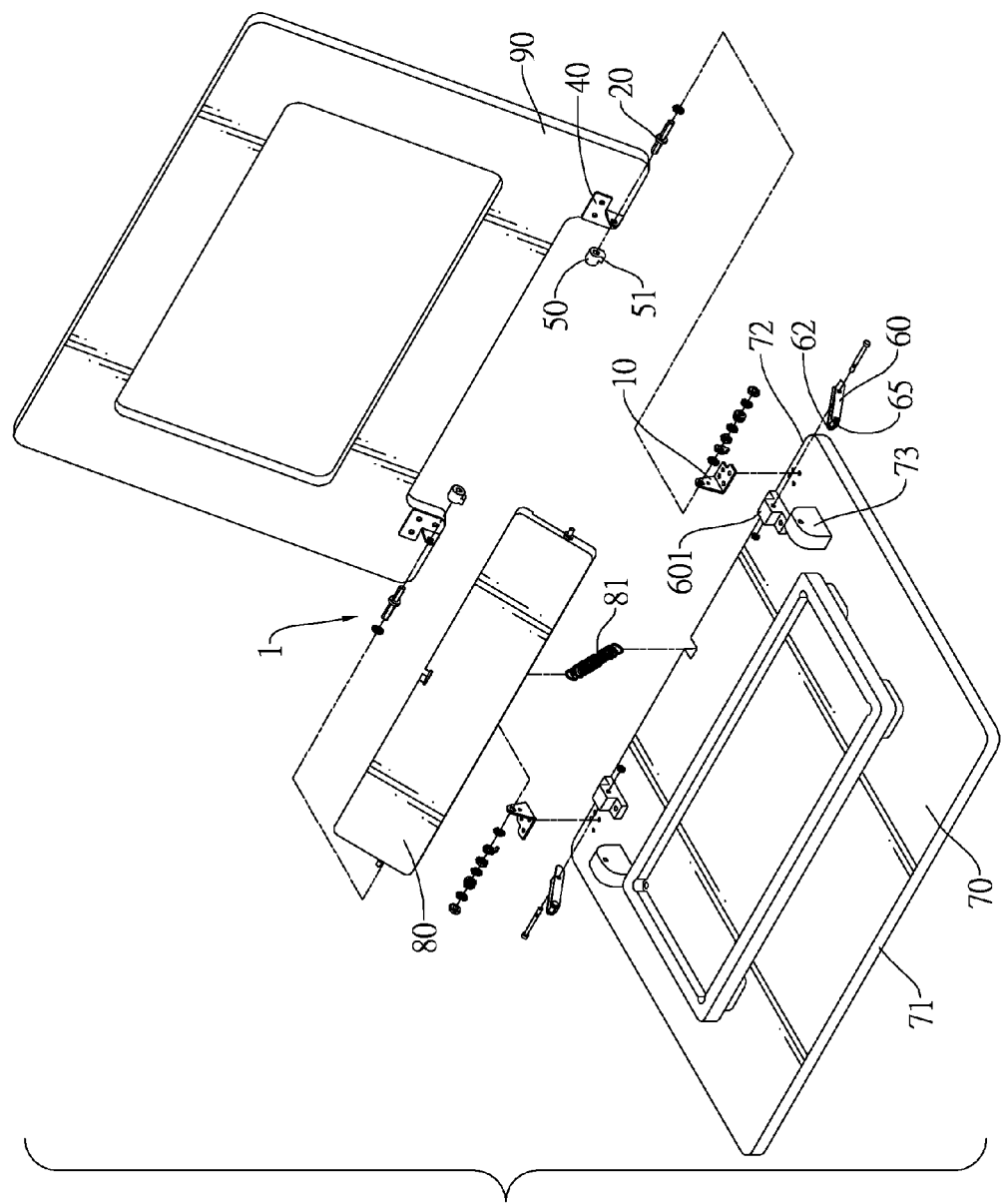
FIG. 4 is an exploded perspective view of the portable electronic device in FIG. 2.

With reference to FIG. 4, a portable electronic device in accordance with the present invention comprises a base (70), a driven panel (80), a cover (90) and two leverage-type hinges (1) as described.

The base (70) has a front (71) and a rear (72). Two pivoting brackets (73) are mounted on the base (70) near the rear (72). The driven panel (80) may have elements, such as an input device or an output device, such as a speaker, an additional keyboard, a display, touch screen panel or the like. The driven panel (80) is mounted pivotally between the pivoting brackets (73). A spring (81) is mounted between the base (70) and an edge of the driven panel (80). The leverage-type hinges (1) are mounted between the base (70) and the cover (90). The stationary brackets (10) and the seats (601) are mounted securely on the base (70). The rotating brackets (40) are mounted securely on the cover (90). The free ends (62) of the leverage brackets (60) abut a bottom surface of the driven panel (80), preferably abut a side edge of the driven panel (80). In a preferred embodiment, the sliding pins (65) abut the bottom surface of the driven panel (80).

When the cover (90) is pivoted relative to the base (70), the rotating brackets (40), the pintles (20) and the actuating sleeves (50) are rotated relative to the stationary bracket (10) and the leverage bracket (60).

Figure 5:
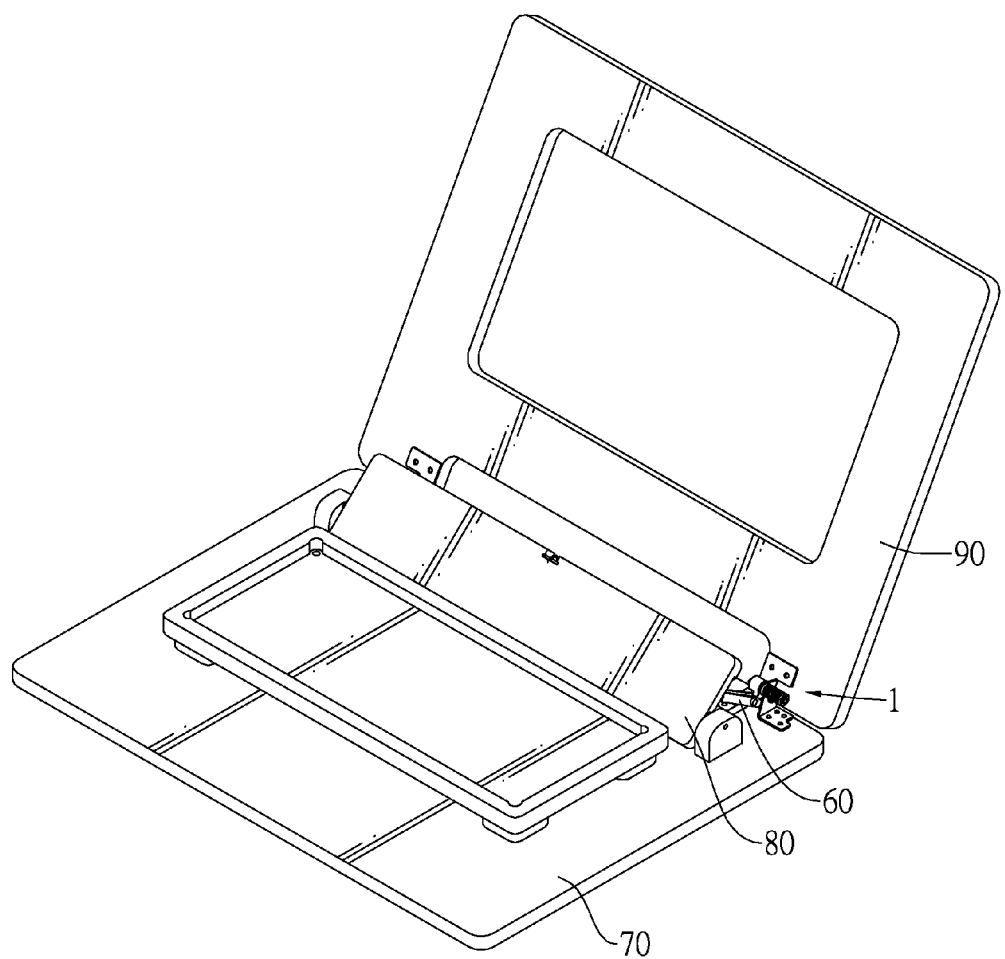
FIG. 5 is an operational perspective view of the portable electronic device in FIG. 2, shown open.
Figure 6:
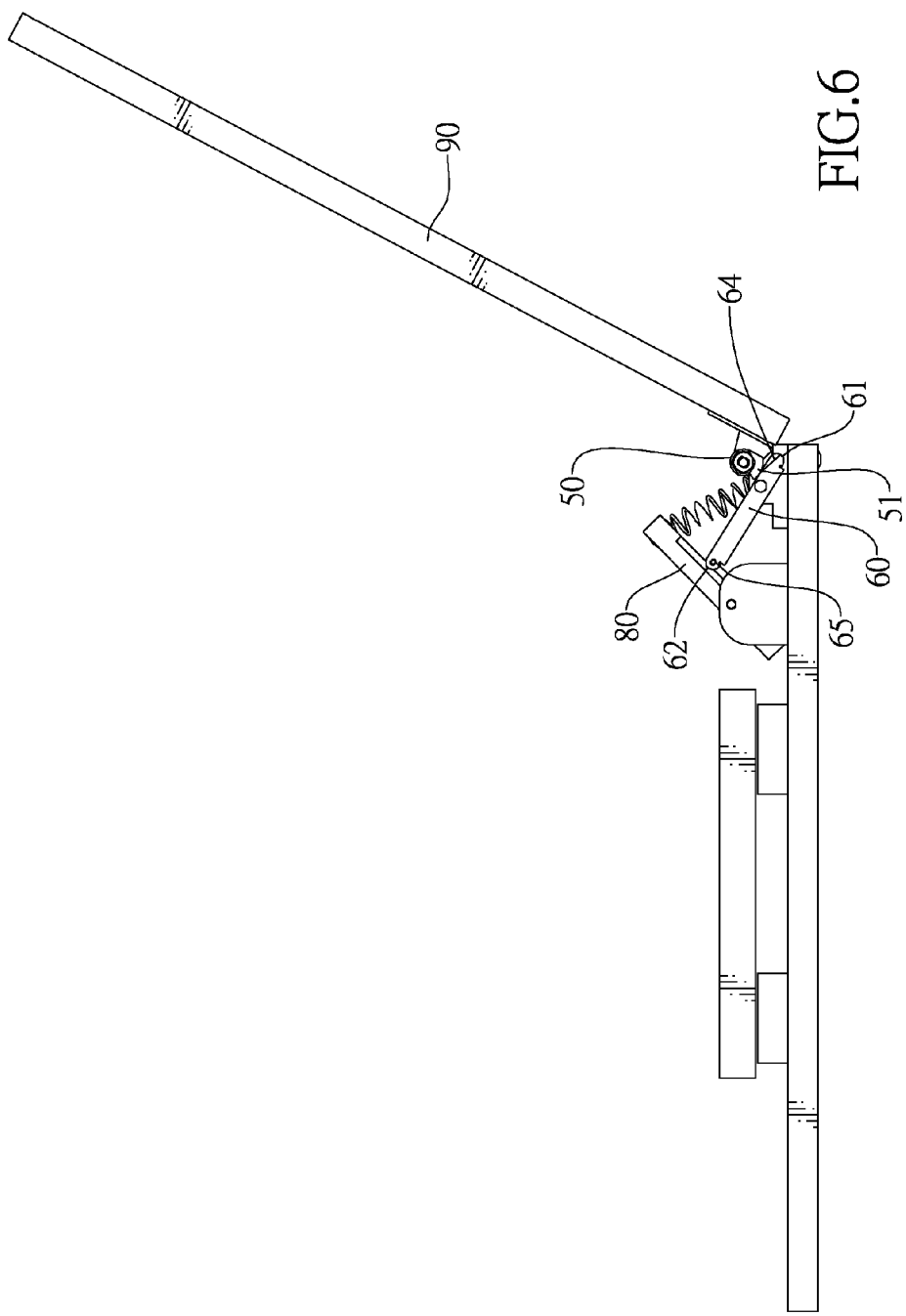
FIG. 6 is an operational side view of the portable electronic device in FIG. 2, shown open.

With reference to FIGS. 5 and 6, when the cover (90) is opened relative to the base (70), the actuating protrusions (51) press the receiving ends (61) to pivot the leverage brackets (60). The free ends (62) are moved upward to push the driven panel (80) to pivot. Then the driven panel (80) is tilted to facilitate use of the elements, such as the input device or the output device, on the driven panel (80).

Figure 7:
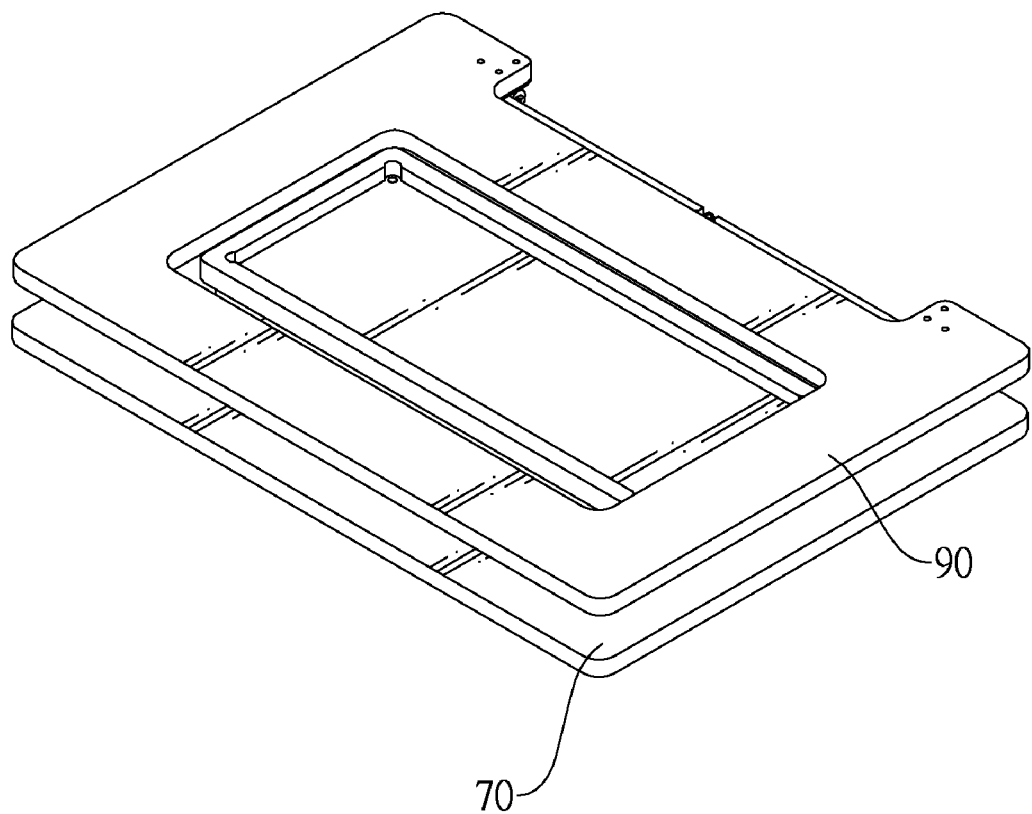
FIG. 7 is an operational perspective view of the portable electronic device in FIG. 2, shown closed.
Figure 8:
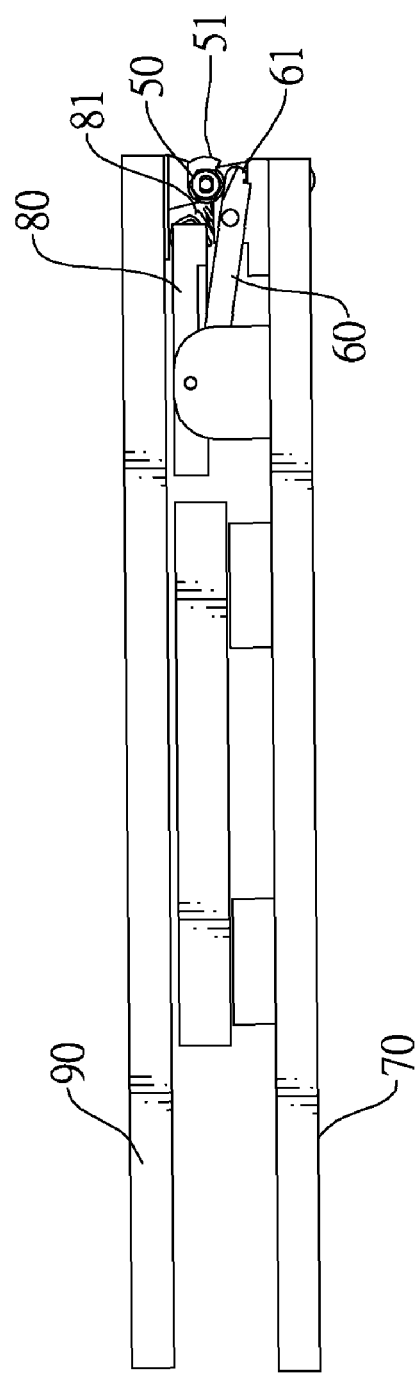
FIG. 8 is an operational side view of the portable electronic device in FIG. 2, shown closed.

With further reference to FIGS. 7 and 8, when the cover (90) is closed relative to the base (70), the actuating protrusions (51) leave the receiving ends (61). Without external force from the actuating sleeves (50), the leverage brackets (60) are pivoted to the initial position based on principles of leverage. Because the driven panel (80) has no external force to maintaining the driven panel (80) in a tilting position, the driven panel (80) pivots to an initial position via the weight of the driven panel (80) and resilient force of the spring (81). Therefore, the driven panel (80) is pivoted as the leverage brackets (60) until returned to the initial position.

Figure 9:
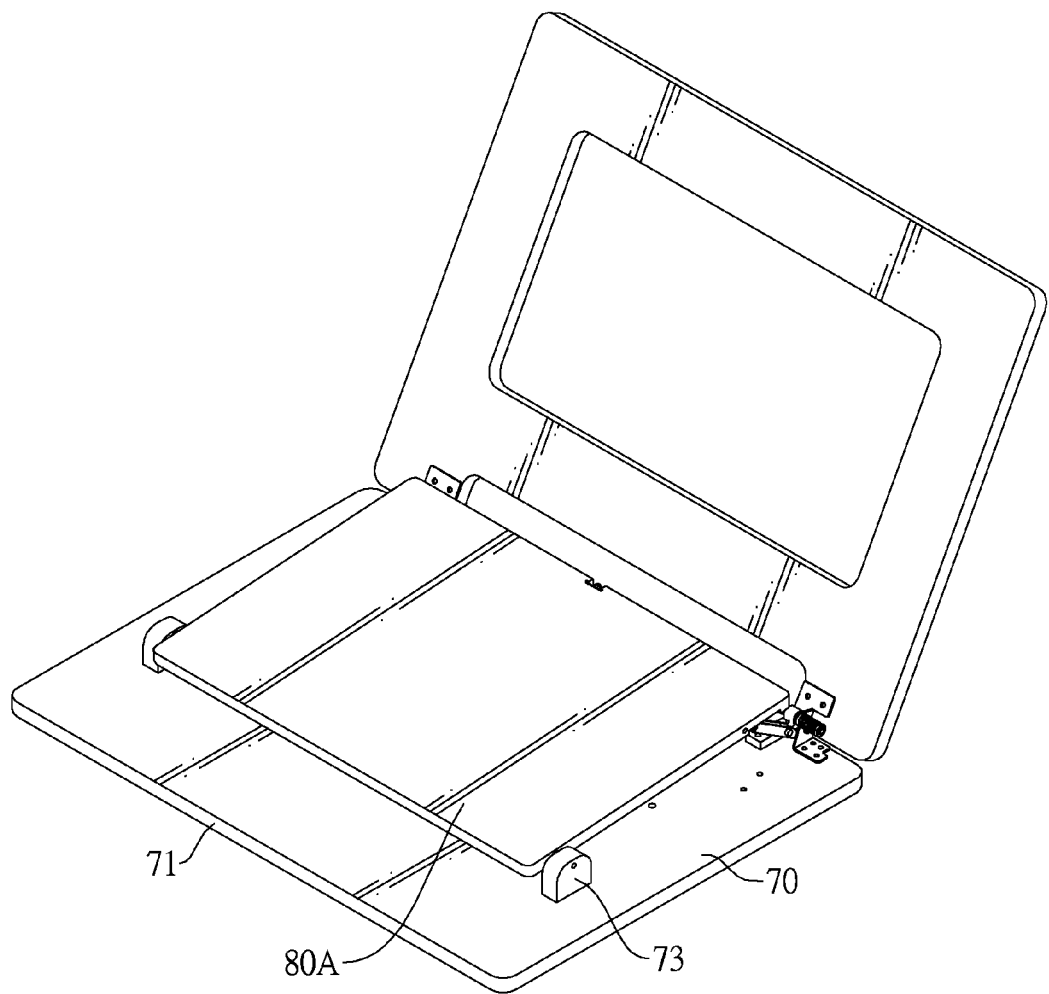
FIG. 9 is an operational perspective view of another embodiment of the portable electronic device in accordance with the present invention, shown open.
Figure 10:
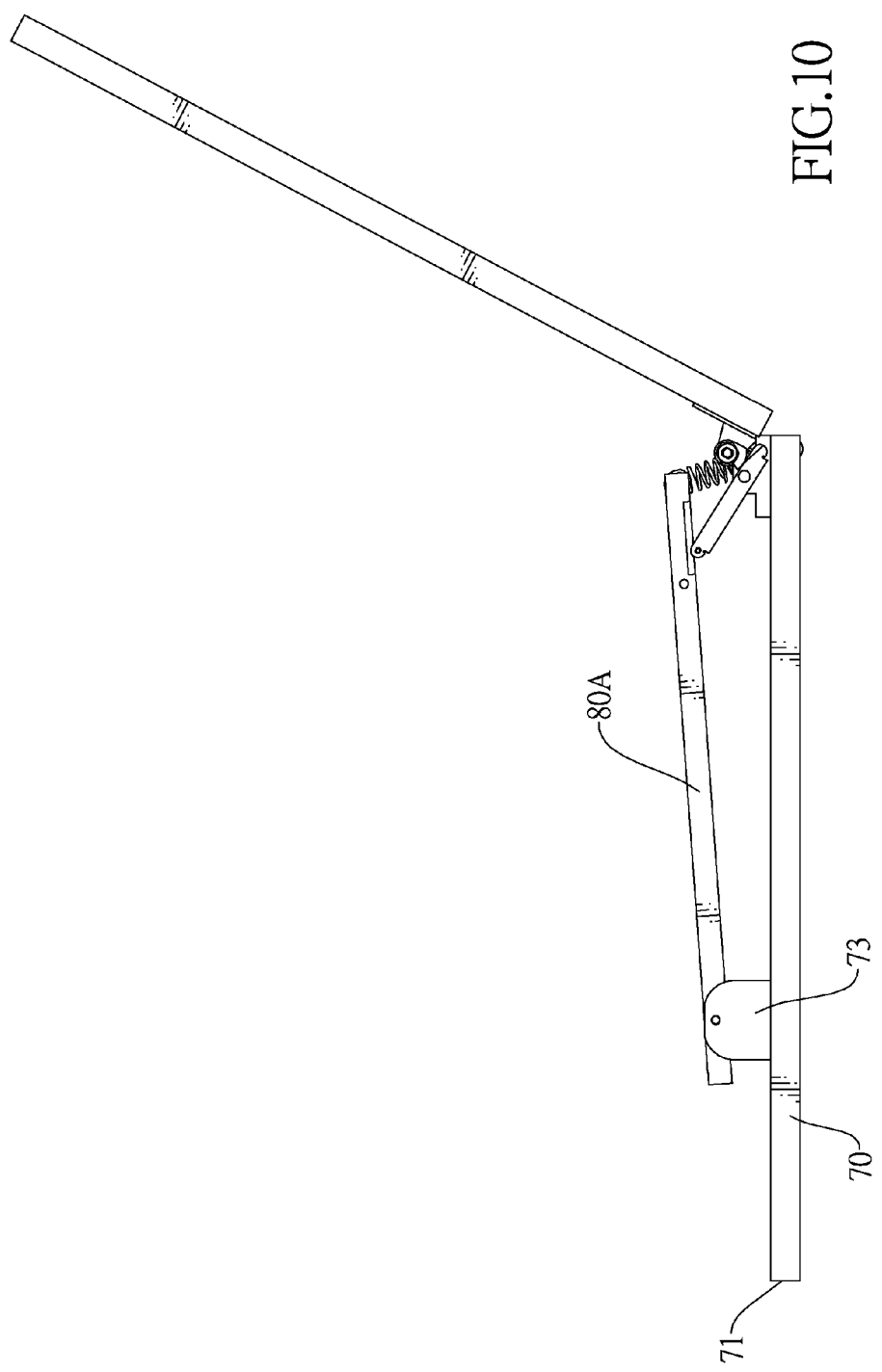
FIG. 10 is an operational side view of the portable electronic device in FIG. 9, shown open.

With reference to FIGS. 9 and 10, the pivoting brackets (73) are mounted near the front (71) of the base (70). The driven panel (80A) has larger areas and may have a keyboard mounted thereon. When the driven panel (80A) is tilted, the tilting keyboard is ergonomically oriented to facilitate usage and comfort of use.

The leverage-type hinge (1) and the portable electronic device as described have following advantages. With the interaction between the actuating sleeve (50) and the leverage bracket (60), the driven panel (80) is tilted simultaneously while the cover (90) is opened relative to the base (70). Therefore, the user easily utilizes the elements on the tilted driven panel (80). Furthermore, the tilted driven panel (80) also varies the appearance of the portable electronic device to enhance uniqueness to attract buyers.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A portable electronic device comprising:
    a base;
    at least one pivoting bracket mounted on the base;
    a cover connected pivotally to the base;
    a driven panel mounted pivotally on the at least one pivoting bracket;
    at least one leverage-type hinge mounted between the base and the cover and each of the at least one leverage-type hinge comprising
        a stationary bracket mounted securely on the base;
        a pintle mounted through the stationary bracket;
        a rotating bracket mounted securely on the cover and mounted securely around and rotated simultaneously with the pintle;
        an actuating sleeve mounted securely around and rotated simultaneously with the pintle and having an actuating protrusion formed on and protruding transversely out from an outside wall of the actuating sleeve;
        a seat mounted securely on the base; and
        a leverage bracket adjacent to the actuating sleeve, connected pivotally to the seat, selectively pushing the driven panel to tilt and having
            a pivoting shaft protruding transversely through the leverage bracket, mounted rotatably in the seat and eccentric to a pivot center of the pintle;
            a receiving end selectively abutting the actuating protrusion of the actuating sleeve; and
            a free end abutting the driven panel;
    wherein when the cover is opened relative to the base, the leverage bracket push the driven panel to tilt gradually; and
    wherein when the cover is closed relative to the base, the driven panel is gradually returned.

2. The portable electronic device as claimed in claim 1, wherein the receiving end of the leverage bracket of each of the at least one leverage-type hinge has an inclined surface selectively abutting the actuating protrusion of the actuating sleeve.

3. The portable electronic device as claimed in claim 1, wherein each of the least one leverage-type hinge has a sliding pin mounted across the free end of the leverage bracket.

4. The portable electronic device as claimed in claim 2, wherein each of the at least one leverage-type hinge has a sliding pin mounted across the free end of the leverage bracket.

5. The portable electronic device as claimed in claim 2, wherein each of the least one leverage-type hinge has a washer assembly mounted around the pintle.

6. The portable electronic device as claimed in claim 1 further comprising a spring mounted between the base and an edge of the driven panel.

7. The portable electronic device as claimed in claim 6, wherein the free end of the leverage bracket of each of the at least one leverage-type hinge abuts a side edge of the driven panel.

8. The portable electronic device as claimed in claim 1, wherein the at least one pivoting bracket is mounted near the rear of the base.

9. The portable electronic device as claimed in claim 6, wherein the at least one pivoting bracket is mounted near the rear of the base.

10. The portable electronic device as claimed in claim 7, wherein the at least one pivoting bracket is mounted near the rear of the base.

11. The portable electronic device as claimed in claim 1, wherein the at least one pivoting bracket is mounted near the front of the base.

12. The portable electronic device as claimed in claim 6, wherein the at least one pivoting bracket is mounted near the front of the base.

13. The portable electronic device as claimed in claim 7, wherein the at least one pivoting bracket is mounted near the front of the base.

14. The portable electronic device as claimed in claim 1, wherein the driven panel has an input device.

15. The portable electronic device as claimed in claim 1, wherein the driven panel has an output device.

* * * * *